Aug. 2, 1966   J. R. SHACKELFORD   3,263,466
TOOL
Filed Feb. 3, 1964
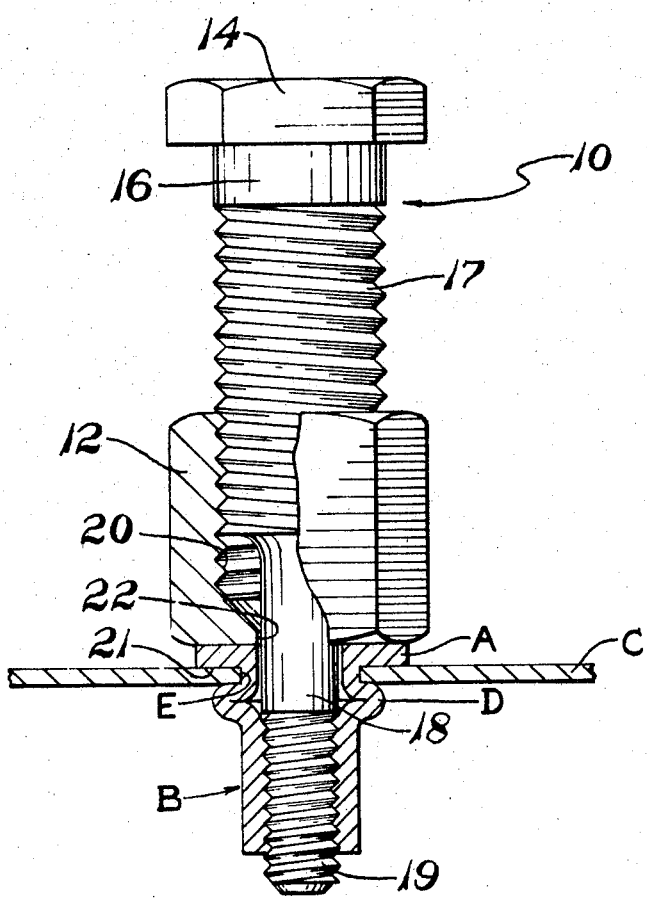
INVENTOR.
JAMES R. SHACKELFORD
BY John D. Haney
ATTY.

United States Patent Office 3,263,466
Patented August 2, 1966

3,263,466
TOOL
James R. Shackelford, Cuyahoga Falls, Ohio, assignor to
The B. F. Goodrich Company, New York, N.Y., a
corporation of New York
Filed Feb. 3, 1964, Ser. No. 341,939
1 Claim. (Cl. 72—114)

This invention relates to a tool for installing fasteners in a work piece. More particularly, the tool of this invention is used for installing threaded fasteners of the type which are axially deformed so that they engage the work piece by radial bulging.

The tool of this invention is characterized by extreme simplicity and is therefore very economical. It is designed for operation solely by the use of conventional hand wrenches.

A tool made in accordance with this invention is shown in the accompanying drawing. The tool is shown in engagement with an axially deformable fastener of the type which has been sold under the trademark "Rivnut".

The tool consists of a special upsetting bolt 10 in threaded engagement with a nut 12. The bolt 10 has a wrench-engageable head 14 at the top of a thick shank 16 on which there is an external thread 17. At the lower end of shank 16 there is a smaller shank 18 having an external thread 19. The smaller shank 18 is integral with and concentric of shank 16.

The thread 19 on the smaller shank 18 is of opposite hand to the thread 17 on the larger shank 16. In practice, inasmuch as the axial deformable fasteners are normally made with a right-hand thread, the thread 19 will be a right-hand thread, to mate with the fastener thread, whereas the thread 17 will be a left-hand thread.

The nut 12 has an internal thread 20 which mates with the thread 17 on the large shank 16. The lower face 21 of the nut 12 is a plane annular surface and has an opening 22 through it just large enough to permit the smaller shank 18 to project through it freely. The lower face 21 is adapted to engage the head A of a fastener B and operates as an anvil to hold the fastener in a work piece C as the tool is operated to axially deform the fastener until it bulges as at D into engagement with the work piece.

In the use of this tool the nut 12 is initially threaded onto the large thread 17 so that the small shank 18 projects axially from the bottom of the nut. The fastener B is then threaded onto the small thread 19 on the small shank 18. Ordinarily the fastener, in its undeformed condition, will have a tubular body of uniform dimension slightly smaller than the diameter of a hole E in the work piece C. The assembly of the tool and fastener is then inserted through the hole in the work piece until the head A of the fastener is seated firmly against the work piece.

The head 14 is preferably hexagonal so that it can be engaged conveniently with an appropriate hand wrench (not shown). Similarly, nut 12 is hexagonal for engagement with another similar wrench (not shown). With such wrenches engaged, the fastener is upset or deformed by holding the wrench engaged with head 14 to prevent rotation of the fastener and bolt 10, while using the other wrench to turn nut 12 in a direction to advance the nut 12 along thread 17 axially away from the head 14. The head A of the fastener is kept at all times seated snugly against the work piece. Accordingly, the smaller shank 18 of the bolt is displaced axially upward relative to the nut 12 thereby axially compressing the fastener and causing it to bulge at D against the work piece.

It is important to form the two threads 17 and 19 of the bolt 10 of opposite hand to avoid unscrewing the thread 19 from the fastener when nut 12 is turned.

When the fastener has been fully bulged against the work piece, the upsetting tool is then removed simply by turning the nut 12 reversely to back it away from the head A of the fastener, and then unscrewing the small shank 18 from the fastener. This operation leaves the fastener tightly in the work piece with its threaded region available to receive another threaded part as may be required.

A particular advantage of this tool is that it is very simple in its construction and operation, and it is, therefore, very economical.

By referring to the head 14 and nut 12 as being of "hexagonal" shape, we intend to include any polygonal shape which can be engaged by a common wrench, and in fact other configurations requiring even special shaped wrenches are included within the meaning of the term "polygonal." The head 14 could be designed with either the external polygonal shape as shown or with an internal polygonal configuration or a slot for a screw driver.

I claim:
A tool for upsetting axially deformable threaded fasteners, said tool comprising:
(A) a bolt having
(1) a wrench-engageable head;
(2) a large shank with an external thread thereon; and
(3) a smaller shank coaxial with said large shank and with an external thread thereon of opposite hand than said thread of said large shank; and
(B) a nut having
(1) a wrench-engageable external surface;
(2) an external thread mating with the thread of said large shank;
(3) a partially closed end through which only said small shank projects; and
(4) said closed end having an external surface adapted to bear against the head of a fastener threaded onto said small shank projecting through said nut;
(C) said tool being operable by turning said nut on said thread of said large shank relative to said bolt to displace said small shank axially into said nut and thereby axially compress a fastener between said closed end of said nut and the engaged regions of said small shank with said fastener.

References Cited by the Examiner
UNITED STATES PATENTS
2,437,191   3/1948   Gill _____ 72—114
FOREIGN PATENTS
125,298   4/1919   Great Britain.
284,459   6/1915   Germany.

CHARLES W. LANHAM, *Primary Examiner.*